June 9, 1953

B. WALKER 2,641,500

VEHICLE HAVING OFFSET RADIATOR AND
TIRE LOCATED ADJACENT THERETO
Original Filed Oct. 23, 1946

INVENTOR.
Brooks Walker
BY
Harness, Dickey & Pierce
ATTORNEYS.

Patented June 9, 1953

2,641,500

UNITED STATES PATENT OFFICE 2,641,500

VEHICLE HAVING OFFSET RADIATOR AND TIRE LOCATED ADJACENT THERETO

Brooks Walker, Piedmont, Calif.

Original application October 23, 1946, Serial No. 705,089. Divided and this application July 6, 1949, Serial No. 103,293

3 Claims. (Cl. 296—37.2)

1

This invention relates to automobiles and particularly to compartments therein for the reception and storage of tires, and is a division of my application, Serial No. 705,089, filed October 23, 1946, now Patent No. 2,563,981, for improvements in Automotive Vehicle Gas Tank and Tire Mounting.

It has been the practice in the past to support a spare tire or wheel within the rear luggage compartment, at the rear of the compartment or beneath the floor thereof. All of these locations have substantially hampered the size and use of the compartment, and it is one object of the present invention to locate the tire or wheel under the hood of the vehicle so as to increase the available luggage space in the rear deck compartment.

A further object of the invention is to mount a spare tire within the engine compartment beneath the hood at the forward portion thereof at the side of the radiator.

It is a still further object of the invention to provide a compartment in the engine compartment forwardly thereof beneath the hood in a space between the radiator and the side wall of the compartment in which a tire or wheel, luggage, tools and the like may be carried.

It is a still further object of the invention to shift the radiator to one side of the engine compartment to provide a space on the opposite side thereof and the wall of the compartment for the storage of tires, luggage and the like.

Figure 1:
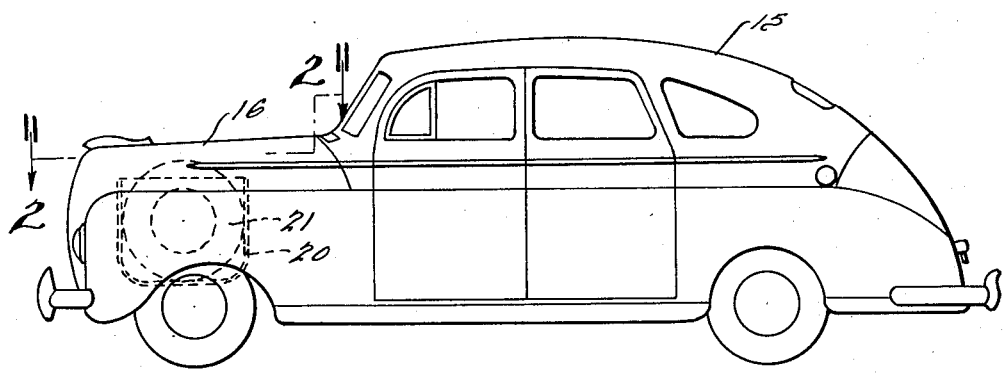
Figure 2:
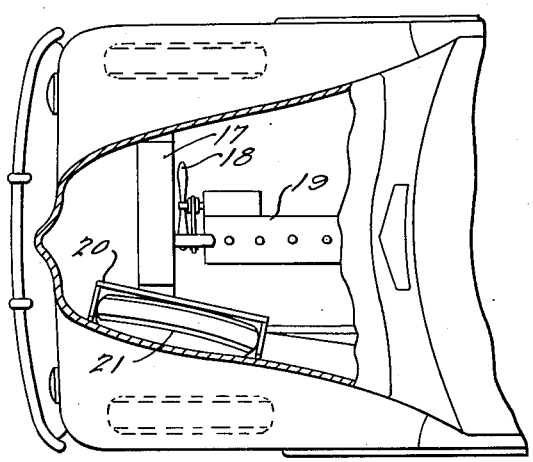

Other objects and features of novelty of the invention will be specifically pointed out or will become apparent when referring, for a better understanding of the invention, to the following description taken in conjunction with the accompanying drawing, wherein:

Figure 1 is a view in elevation of an automobile having a door mounted thereon in a manner embodying features of the present invention, and Fig. 2 is a sectional view of the structure illustrated in Fig. 1, taken on the line 2—2 thereof.

Referring to the figures, an automobile 15 is illustrated of conventional form, having a hood 16 enclosing an engine compartment between the fenders extended outwardly from the compartment over the front wheels. The radiator 17 beneath the hood has a space between one side thereof and the wall of the engine compartment. This space may be obtained by shifting the radiator 17 to the opposite side of the engine compartment, with a fan 18 also offset from the engine 19 so as to be aligned with the radiator. Between the side edge of the radiator and the wall of the engine compartment, a compartment 20 is provided in which a tire or wheel 21 of the automobile 15 may be mounted. It is to be understood that the compartment may be employed for carrying luggage, tools, accessories or the like. The top edge of the compartment may be sealed to the hood by having suitable flexible material,

2 such as rubber, felt and the like provided at the upper edge of the walls of the compartment 20, or which may be applied to the inner surface of the hood. The flexible material prevents squeaks and noises occurring between the walls and the hood and forms a seal for the compartment.

When the compartment is located in this manner at the forward portion of the engine compartment, the compartment is maintained cool out of the heat area which results from the engine operation. By sealing the compartment in the manner above described, the tire or other articles carried in the compartment are protected from the accumulation of grime or dirt, which would accumulate thereon if the compartment were not so sealed and if located otherwise than at the front extremity of the engine compartment beneath the hood.

What is claimed is:

1. In an automobile having a hood over a radiator located at the front of an engine compartment of the automobile body, a spare tire, and a carrier for said spare tire under said hood at the side of the radiator located to have portions of the tire extending forwardly and rearwardly thereof, said radiator being disposed transversely of the body with its center offset from the center of the body toward the side opposite to that containing said tire carrier.

2. In an automobile having a body and an engine compartment extending forwardly thereof which is enclosed by a hood, a radiator disposed in the front portion of said compartment beneath said hood having its center line offset from the center line of the body to provide a space at one side thereof, and a support for a spare tire within said engine compartment beneath said hood within said space at the side of the radiator.

3. In an automobile having a body and a forward engine compartment covered by a hood, a radiator within the forward portion of said compartment offset laterally from the center line of the body, and a support for a tire within said compartment disposed between the compartment wall and the radiator on the side opposite to that toward which said radiator is offset.

BROOKS WALKER.

References Cited in the file of this patent

UNITED STATES PATENTS

| Number | Name | Date |
|---|---|---|
| 1,527,431 | Gumpper | Feb. 24, 1925 |
| 1,754,086 | Feilcke | Apr. 8, 1930 |
| 1,842,038 | Masury | Jan. 19, 1932 |
| 1,988,346 | Wagner | Jan. 15, 1935 |
| 1,995,501 | Dillon | Mar. 26, 1935 |
| 2,117,040 | Schjolin | May 10, 1938 |

FOREIGN PATENTS

| Number | Country | Date |
|---|---|---|
| 731,787 | France | May 31, 1932 |